United States Patent [19]

Smolen, Jr.

[11] Patent Number: 4,801,019

[45] Date of Patent: Jan. 31, 1989

[54] SHOCK ABSORBING UNIT ASSISTED BY FIBERGLASS REINFORCED SPRING

[76] Inventor: George W. Smolen, Jr., 208 Knoxwood Ct., Anderson, S.C. 29621

[21] Appl. No.: 930,698

[22] Filed: Nov. 13, 1986

[51] Int. Cl.⁴ .............................. F16F 3/02; F16F 1/36
[52] U.S. Cl. .................................. 267/151; 267/217; 267/227; 267/149
[58] Field of Search .................. 267/8 R, 22 R, 64.15, 267/129, 140.1, 140.3, 140.4, 149, 151, 152

[56] References Cited

U.S. PATENT DOCUMENTS

| | | | |
|---|---|---|---|
| 1,150,714 | 8/1915 | Sparks | 267/22 R |
| 2,594,665 | 4/1952 | Lockwood | 267/152 X |
| 3,181,852 | 5/1965 | Paller | 267/8 R |
| 4,389,045 | 6/1983 | Taylor | 267/8 R |

FOREIGN PATENT DOCUMENTS 077941   5/1983   Japan .................. 267/149

OTHER PUBLICATIONS

"Light Van has Mass-produced 6RP Springs", David Scott and Jack Yamaguchi, Feb. 1986, pp. 113–116, *Automotive Engineering*.

*Primary Examiner*—Andres Kashnikow
*Assistant Examiner*—Richard Potosnak
*Attorney, Agent, or Firm*—Cort Flint

[57] ABSTRACT

A shock absorbing spring device (A,C) is illustrated which includes a plurality of elongated, slender spring elements (B). The device may also include a central shock absorbing unit (10). Spring elements (B) comprise fiber reinforcing strands (32) embedded in the matrix material (31). Spring elements (B) have a contoured profile which includes a thickened medial bend (38) and a reverse bend (44) formed at ends (34,36). In this manner, spring elements (B) deflect outwardly from their longitudinal axis in a reliable manner when ends (34) and (36) are loaded with compression. In one embodiment of the device (A) spring elements (B) are arranged to deflect radially with respect to longitudinal axis (37) of the device. In another embodiment (C) medial portion (38) of spring elements (B) deflect circumferentially in a row about longitudinal axis (43) of the device. Preferably, the cross-section of spring elements (B) varies from a maximum thickness at medial portion (38) to a minimum thickness at ends (34,36) defining cantilevered arms (34a, 36a) which deflect in as medial portion (38) deflects outwardly. A second row (50) of spring elements (B') may be included for overload capacity.

30 Claims, 4 Drawing Sheets

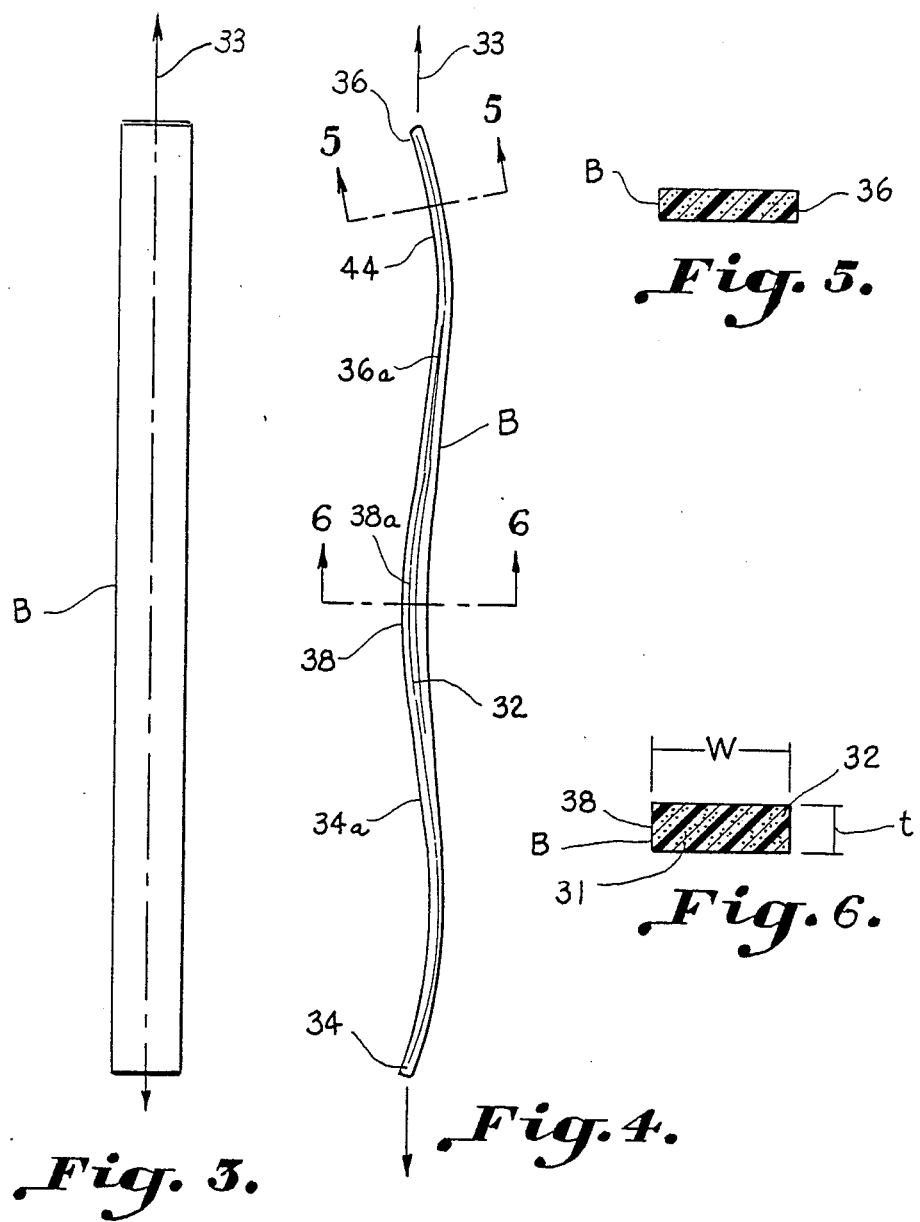

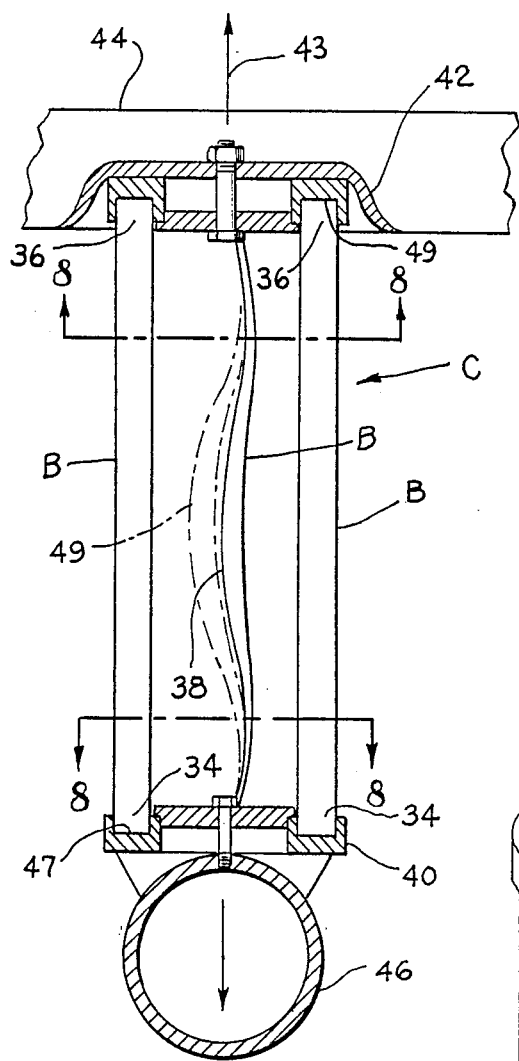
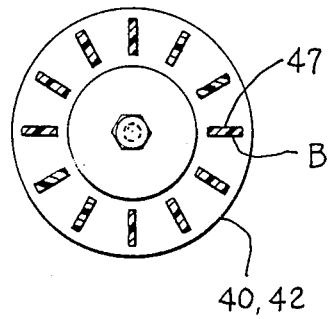
Fig. 8.
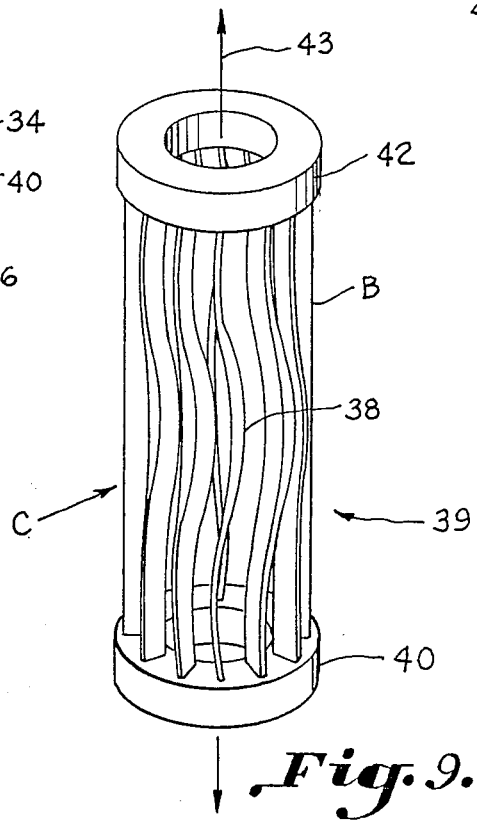
Fig. 7.
Fig. 9.

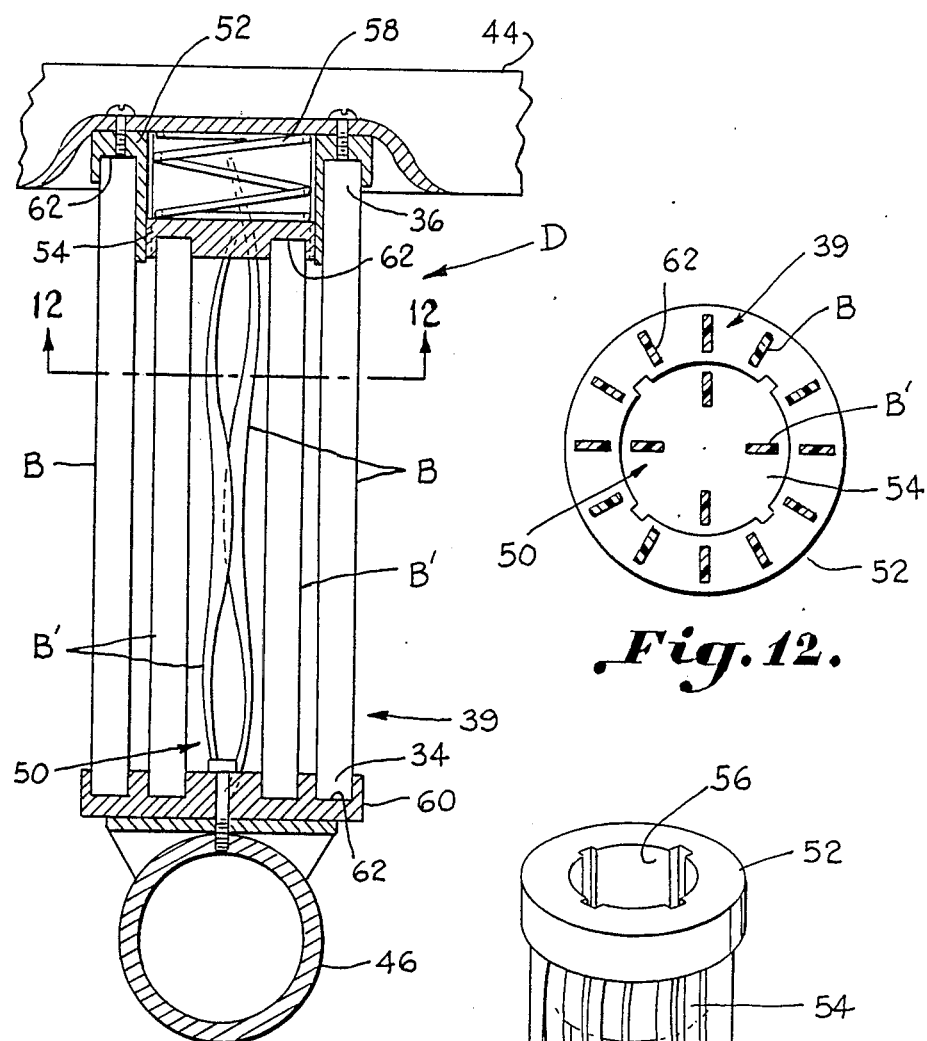
Fig. 11.
Fig. 12.
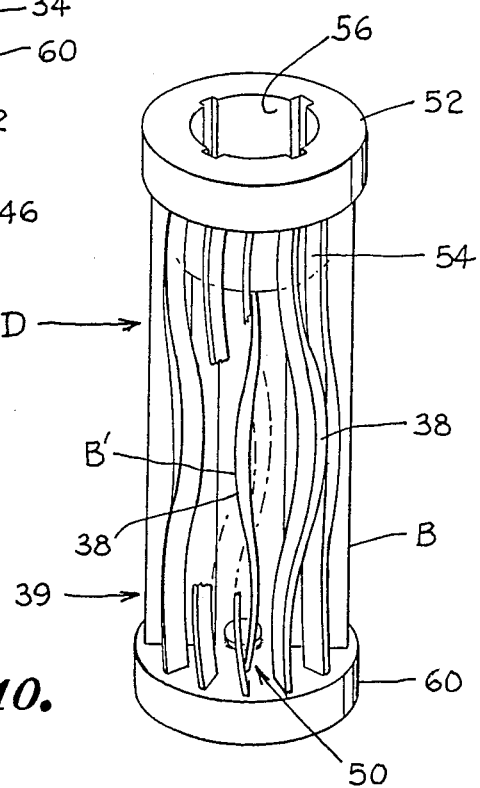
Fig. 10.

SHOCK ABSORBING UNIT ASSISTED BY FIBERGLASS REINFORCED SPRING

BACKGROUND OF THE INVENTION

The invention relates to a spring assisted shock absorbing device of the type used in the suspension system of an automobile wherein the vertical relative movement of a telescoping shock absorbing unit is utilized in combination with a spring. Typically, coil springs have been used adjacent the shock absorbing unit or mounted about the shock absorbing unit in a concentric fashion to support the static load of the vehicle and also act as an overload spring.

The purpose of the vehicle suspension system is to support the vehicle's body and frame on the wheels and provide absorption of road shock caused by the passage of the wheels over irregularities. Heretofore, leaf springs, coil springs, torsion bar springs, and hydraulic springs have been utilized in the suspension systems of vehicles. The weight of the automobile is applied on initial compression to the springs and when the wheels encounter irregularities in the highway or other surface, the springs further compress to absorb the additional shock. The spring may also compress considerably due to heavy loading of the vehicle, or due to banking or leaning of the vehicle while undergoing curves or turns at high speeds.

Shock absorbing units are utilized in conjunction or as a replacement for springs to restrain excessive spring movement and prevent prolonged isolations which would provide a generally rougher ride.

The present invention is directed more particularly to shock absorbing units which are combined with a spring either externally or concentrically placed about the shock absorbing unit. Coil type springs have been commonly used to assist the shock absorbing unit by concentrically mounting the coil springs around the shock absorbing unit as shown in U.S. Pat. Nos. 3,951,391; 3,877,687; 3,251,591; and 3,181,852. These devices all employ coil springs typically fabricated from metal.

One of the problems of the combined spring and shock absorber is that the vehicle rides high and has a definite tendency to bounce when passing over highways or other surface irregularities. The coil spring has typically been manufactured from a metal. Due to the weight and mass of the metal coil spring, it requires considerable energy to stop its oscillations once it is deflected. Another problem with the concentrically mounted coil spring is that it may bind upon the shock absorber under heavy loads or deflections. Also, after repeated usage, the metal coil spring will lose its memory and become weakened in its capacity to absorb shock proportions.

Fiber reinforced material, such as fiberglass, has been utilized in automobile leaf springs and general spring devices such as shown in U.S. Pat. No. 2,913,240. However, the reinforcing characteristics of fibers present in these devices and arrangements of these devices have generally not made them applicable to use with coil spring arrangements. Telescoping parts have been utilized with other spring elements such as the exercise device shown in U.S. Pat. No. 3,958,803 which generally forms no part of the art related to vehicle suspension units.

Accordingly, an object of the present invention is to provide a light weight spring element for use in connection with a shock absorbing unit in the suspension system of a vehicle.

Another object of the invention is to provide a combined spring and shock absorbing unit having improved shock absorbing characteristics.

Another object of the invention is to provide a combination spring/shock absorbing unit in which a spring assists the shock absorbing unit and absorbs shocks from highway and other surface irregularities in a manner that undampened oscillations are greatly minimized.

Another object of the present invention is to provide a spring device for a vehicle suspension unit and the like having a spring which retains its memory and length during repeated loading so that the system uniformly acts to absorb road shocks.

Still another object of the invention is to provide a fiber reinforced spring which will handle compression loads in a vehicle suspension system and the like.

SUMMARY OF THE INVENTION

The above objectives are accomplished according to the present invention by providing a fiber reinforced spring assembly which acts under compression in the place of the typical coil spring utilized in the suspension system of the vehicle. The fiberglass spring assembly comprises a plurality of elongated slender spring elements reinforced with generally parallel and longitudinal fibers arranged in the spring element. The spring element is substantially elongated and narrow having opposed ends which are affixed in movable supports of the suspension system. A first support is typically attached to a control arm of the suspension system and the second support is attached to the frame or cross member of the suspension system. The spring elements have their ends affixed to the support parts such that the ends undergo compression upon the vehicle encountering road shocks from highway or other surface irregularities. Once the ends of the spring elements undergo compression a medial portion of the spring elements bows outwardly to accommodate the loads. The fiber reinforced spring assembly may be combined with a shock absorbing unit so that the shock absorbing unit may control the initial impact loads on the fiberglass spring elements and may also control the rebound of the fiberglass spring elements in a manner that a smooth controlled ride is provided. During the rebound, the shock absorber may control the rebound of the weight of the automobile as the fiberglass spring element tends to straighten or unload.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3 is a rear elevation of an elongated fiber reinforced spring element constructed in accordance with the present invention;

FIG. 4 is a side elevation of a fiber reinforced spring element constructed in accordance with the present invention;

FIG. 5 is a sectional view taken along line 5—5 of FIG. 4;

FIG. 6 is a sectional view taken along line 6—6 of FIG. 4;

FIG. 7 is a sectional view of an alternate embodiment of a spring device for an automotive vehicle suspension system constructed in accordance with the present invention;

FIG. 8 is a sectional view taken along line 8—8 of FIG. 7;

FIG. 9 is a perspective view of the alternate embodiment of the invention illustrated in FIGS. 7 and 8;

FIG. 10 is a perspective view of another embodiment of a fiberglass spring device for a vehicle suspension system and the like having an overload capacity;

FIG. 11 is a sectional view of the device of FIG. 10; and

FIG. 12 is a sectional view taken along line 12—12 of FIG. 11.

DESCRIPTION OF A PREFERRED EMBODIMENT

Figure 1:
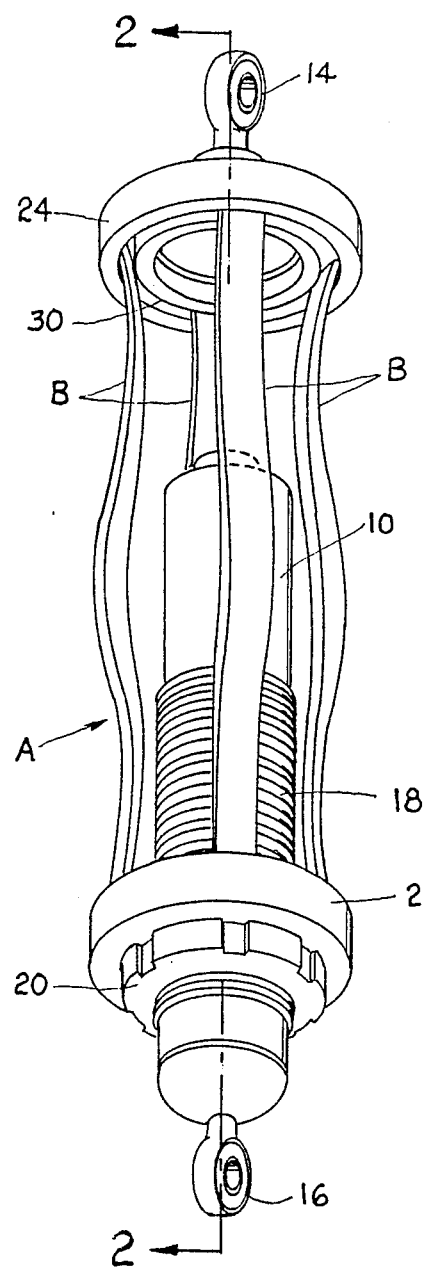
FIG. 1 is a perspective view illustrating a combined spring/shock absorber device constructed in accordance with the present invention.

Referring now in more detail to the drawings, a combined spring shock absorber device is illustrated generally at A. The unit includes a shock absorber 10 comprising a fluid cylinder 11 and a piston rod 12. Piston rod 12 includes a spherical ball joint end 14 which may be connected to a frame section or suspension member of the vehicle (not shown). The opposing end of the hydraulic cylinder 10 includes a second spherical ball joint end 16 which may be connected to an opposing control arm or suspension member (not shown). It is to be understood, of course, that the ends 14 and 16 may be turned around and connected to the various parts in a reversed manner.

A threaded sleeve 18 is affixed to the hydraulic cylinder 10 and includes a threaded spanner nut 20 which travels up and down the threaded sleeve for adjustability. A first support 22 is carried by the spanner nut and thereby fixed in movement against the spanner nut. A second support 24 is carried against a retainer flange 26 which fixes the support against movement away from the first support 22. In this manner, first and second supports are fixed in their movement away from each other. Each support member 22 and 24 includes a circumferential groove 28 and 30, respectively for receiving ends of a plurality of fiber-reinforced spring elements B.

Each spring element B includes an elongated slender fiber reinforced spring element in which reinforcing fibers 32 are arranged generally parallel and longitudinal in the spring element which comprises a suitable matrix material 31 in which the fibers are embedded. Preferably, the matrix material is an epoxy resin. The reinforcing fibers are preferably fiberglass; however, it is to be understood that other suitable fibers such as kevlar or carbon may also be utilized.

The spring element B has a thin cross-section defining a narrow plane in which the fibers are arranged parallel across the width "W" and thickness "t" of the spring element along longitudinal axis 33 thereof. The spring elements have a fixed, defined length from one end 34 to an opposing end 36 and a variable cross-section wherein a medial portion of the spring element is thickened relative to the ends. The cross-section thickness "t" varies from a maximum at medial portion 38 to a minimum at ends 34 and 36. Due to the contoured profile of the spring elements, the spring elements deflect outwardly and radially with respect to longitudinal axis 37 of the device A, as can best be seen in FIG. 2 when the ends are under compression. In this sense, the contour and medial portion provide a means acting on the spring for assisting the deflection of the spring element in the desired direction.

As can best be seen in FIGS. 3–6, spring elements B include a medial bend 38a at medial portion 38 which is curved outwardly in a concave manner with respect to longitudinal axis 37. A reverse bend 44 is formed at each end 34 and 36 which reverses the curve profile in such a manner that ends 34 and 36 engage in grooves 28 and 30 in a generally interlocking manner. In this manner, the ends are retained for compression as the spring is loaded during road shocks. As the ends are placed under compression and medial portion 38 deflects outwardly, the ends are held in the grooves and an axial compression load is placed on the spring element through the ends causing deflection as can best be seen in FIG. 2.

Referring to the cross-sections shown in FIGS. 5 and 6, it can be seen that the thickness of the cross-section of the medial bend portion is greater than that of the reverse bend of the ends. The greater thickness of medial portion 38 creates a hinge so that arms 34a and 36a are defined on each side of medial portion 38. Arms 34a and 36a act as cantilevered arms cantilevered from medial portion 38 and bend inwardly about medial portion 38 as medial portion deflects outwardly.

It is to be understood that other means for assisting the deflection medial portion of the spring in the desired direction may be utilized rather than a contoured profile such as a mechanical arrangement. For example, in a mechanical arrangement, a cam rider (not shown) may ride the shaft of the rod 10 and be shaped to engage the spring element and force them outwardly as the end supports 24 and 28 move towards each other.

Figure 2:
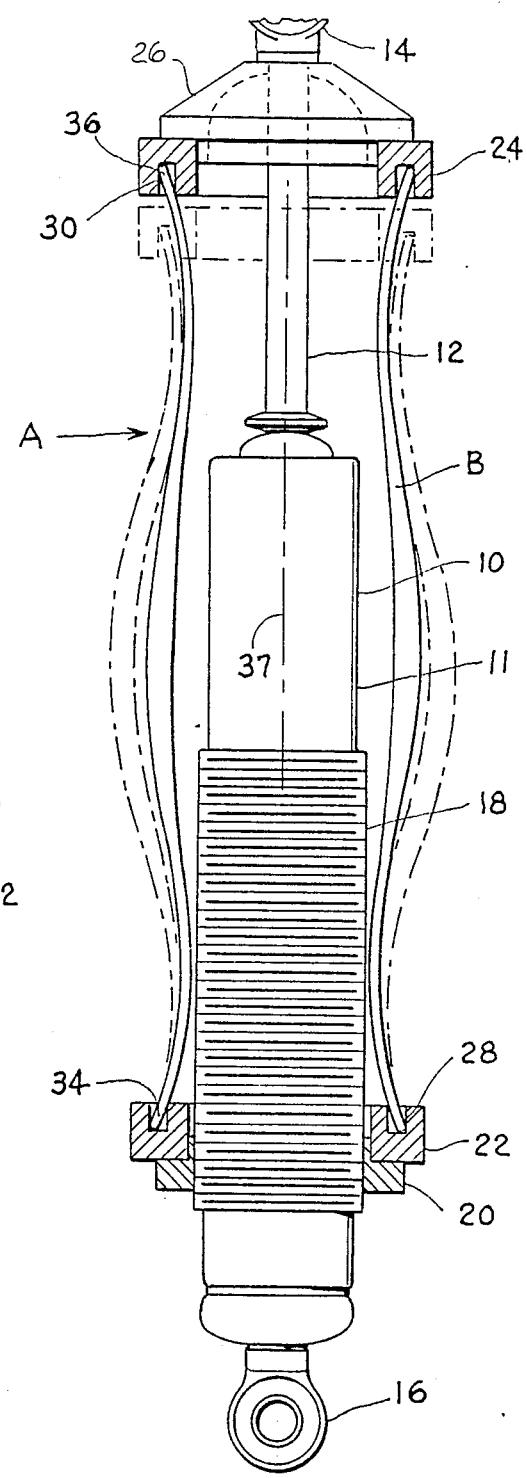
FIG. 2 is a sectional view taken along line 2—2 of FIG. 1 with the deflection of the fiberglass spring elements shown in dotted lines.

While four spring elements B are shown in FIGS. 1–2, it is to be understood that the invention may be practiced with at least two or more, i.e. a pair, of spring elements. Also, the embodiment of FIGS. 1–2 may be advantageously used with or without a shock unit.

Spring elements B are in the form of a half eliptic or otherwise curved so that with the ends and the supports the ends are placed under compression. A constant cross-section spring element may also be utilized in some light applications.

Another embodiment of a spring device generally designated as C, may be provided in accordance with the invention as shown in FIGS. 7 through 9 wherein the spring elements B are arranged facing each other in a circumferential row, illustrated generally at 39 in a cage-like construction. Ends 34 and 36 are held in support members 40 and 42 in row 39 concentric to axis 43 of device C. Support members 40 and 42 may be fixed in the pockets of a suspension system of a vehicle commonly referred to as a fixed pocket suspension system. For example, support 42 may be attached to a frame section 44 and support 40 to an axle section 46. Moreover, this type of suspension typically requires the prior coil springs to have their ends fixed to the respective supports in a prescribed direction.

In this arrangement, space for deflection may be limited, and the spring elements may not be arranged in a diametrically facing position as in the embodiment of FIGS. 1 and 2, but may be arranged facing each other in circumferential row 39 as can best be seen in FIGS. 8-9. As the fixed pocket supports 40 and 42 move towards each other, the ends of the spring elements B are compressed thus bowing the medial portion forwardly in a counterclockwise direction as viewed from FIGS. 8-9. When this happens, there will be a counterrotation force in the clockwise direction imparted to the fixed pockets of the supports of the springs. The same is generally true of fixed pocket suspension systems which utilize coil springs.

Radial retention slots 47 are formed in support parts 42 and 40 for retaining ends 34,36 of spring elements B and affixing them therein and against rotation. A shock absorbing unit 10 as in FIGS. 1-2 may be utilized in this application or may be used in an external position to the fiberglass springs. The same is true for FIGS. 7-9.

In either of the above embodiments of the invention, spring elements B deflect away from their longitudinal axis 33. However, in the case of the embodiment of FIGS. 1-2, this deflection occurs radially and outwardly relative to device axis 37. In the case of FIGS. 7-9, this deflection occurs circumferential, i.e. the front medial portion deflects toward a back medial portion in the circumferential row 39, as shown by dotted line 49.

Referring to FIGS. 10-12, a device, designated generally as D, is illustrated having a second inside row 50 of shorter fiber-reinforced spring elements B' in the form of elements B advantageously disposed inside row 39 which may be arranged for loading only during overload for overload capacity.

An upper support part 52 holds ends 36 of spring elements B and includes a slider 54 which holds ends 36 of spring elements B'. Slider 54 slides within a sleeve 56 of support 52, and may be held tightly therein by means of a compression spring 58. A lower support part 60 holds ends 34 of spring elements B and B'. Radial retention slots 62 hold the spring elements in support parts 52, 54, and 60.

Spring elements B and B' may be provided in any fashion, the point being that the effect of the two rows of springs 39 and 50 will be cummulative. Spring elements B' are preferably arranged in opposite direction to elements B, as can best be seen in FIG. 10. In this manner, during compression and deflection, torque forces of the rows 39 and 50 tend to nullify each other. Spring elements B and B' may be the same length and act together as a side spring in which more spring elements are included. Preferably, spring elements B' are constructed and profiled like elements B. As illustrated in the overload arrangements of FIGS. 10-12, elements B' are shorter so that spring elements B' are more rigid and have a greater rate or spring force. In this manner, row 50 of spring elements, B' act as an overload spring.

As can best be seen in FIGS. 10-12, when frame section 44 and axle section 46 move towards one another, spring elements B first are compressed. Should heavy loads be encountered, for example, the vehicle may be loaded with cargo or passengers, vehicle frame 44 may be loaded sufficiently to move down and engage slider 54. Thereafter, both rows of springs 39 and 50 act to accommodate road shocks and loads under this overload condition.

The spring elements described and disclosed in the application have been found to have a high cycle life and retain their length in memory during the life of the spring. The fibers arranged generally parallel in a narrow plane in the spring elements are loaded, but generally without high stress areas, the fibers are allowed to bend or elongate generally equally and accommodate the loads placed upon the spring elements. While fiberglass leaf springs have been applied to the suspension systems of vehicles, the leaf springs have normally been applied by fixing the ends and applying force to the middle so as to create a torque force about the ends. Secondly, the springs have been utilized in configurations where the middle of the leaf spring is fixed and forces are applied to the ends of the spring parallel to the fixed point of the center so that torque forces are applied to the end. However, this application does not offer the expedience of fiberglass springs loaded under compression as in the suspension systems for vehicles in accordance with the present invention.

The fiber reinforced spring assembly may be combined with a shock absorbing unit so that the shock absorbing unit may control the initial impact loads on the fiberglass spring elements and may also control the rebound of the fiberglass spring elements in a manner that a smooth controlled ride is provided. During the rebound, the shock absorber may control the rebound of the weight of the automobile as the fiberglass spring element tends to straighten or unload.

While a preferred embodiment of the invention has been described using specific terms, such description is for illustrative purposes only, and it is to be understood that changes and variations may be made without departing from the spirit or scope of the following claims.

What is claimed is:

1. A vehicle spring shock absorbing device for a wheeled vehicle and the like of the type which includes a shock absorbing unit having first and second parts movable in a relative reciprocation motion along a central longitudinal axis of said device, a first support member affixed for movement with said first part, a second support member affixed for movement with said second part, and a spring arranged between said first and second support member for supporting the static load of said vehicle and accommodating loads from road shocks, wherein said device, when not under load, comprises:

a plurality of elongated slender one-piece spring elements arranged generally parallel to the longitudinal axis of said device including fiber reinforcing strands embedded in a matrix material;

said elongated spring elements have a length defined by first and second remote ends arranged between said first and second support members, and a medial portion intermediate said first and second ends;

said medial portion having a cross-section with a thickness that is greater than a thickness of said spring element between said medial portion and said first and second ends so that cantilevered arms are formed generally on opposing sides of said medial portion extending between said medial portion and said first and second ends in a manner that compression of said spring elements causes bending of said cantilevered arms inwardly toward the longitudinal axis of said device during compression;

attachment means affixing said first and second ends of said spring elements to said first and second support members, said one-piece spring elements being constructed and arranged with said attachment means so that when said first and second ends of said spring elements are loaded under compression said medial portion of each said spring element deflects radially with respect to the longitudinal axis of said device when said spring elements are loaded compressively from road shock loads due to irregularities in the road surface and the like.

2. The device of claim 1 wherein said medial portion has a medial bend which curves outwardly relative to said longitudinal axis of said device.

3. The device of claim 1 wherein said spring elements are contoured and include a medial bend curved outwardly and a reverse bend at said first and second ends curved in a reverse direction to the curve of said medial bend.

4. The device of claim 1 wherein said spring elements have a generally rectangular cross-section.

5. The device of claim 1 wherein said rectangular cross-section is variable along the length of said spring elements.

6. The device of claim 1 wherein said attachment means includes retention slots formed in said first and second support members for receiving first and second ends of said spring elements.

7. The device of claim 6 wherein said retention slots include circumferential slots formed in said support members.

8. The device of claim 6 wherein said retention slots include radial slots formed in said support members.

9. The device of claim 6 wherein said elongated spring elements are formed as curved sections with a reverse bend formed at said first and second ends for retaining said ends in said retention slots.

10. The device of claim 1 wherein said elongated spring elements include strands of reinforcing fibers arranged generally parallel in a narrow plane, said reinforcing fibers having a uniform distribution in said matrix material facilitating a high cycle life for the elongation of said fibers as said spring elements are repeatedly compressed.

11. A vehicle shock absorbing device for a suspension system of a vehicle of the type having a first part having a first attachment to a first movable vehicle frame element and a second part having a second attachment to a second movable vehicle frame element, said device having a longitudinal axis extending between said first and second attachments, wherein said device, when not under load, comprises:
said first and second parts being affixed along said longitudinal axis for relative reciprocating movement;
a concentric arrangement of a plurality of elongated slender one-piece spring elements arranged generally parallel to the longitudinal axis of said device;
said elongated spring elements having first and second attached ends attached respectively to said first and second parts and extending therebetween in a generally straight configuration;
said elongated spring elements having a longitudinal axis parallel to said longitudinal axis of said device;
said one-piece spring elements each consisting of a medial portion curved concavely with respect to said longitudinal axis, first and second arms extending respectively between said medial portion and said first and second attached ends, said first and second arms consisting solely of a reverse curve extending directly from said medial portion to said attached ends, said reverse curve being curved in an opposite direction than said concavely curved medial portion, and attachment means affixing said first and second attached ends of said spring elements to said first and second parts in a manner that said first and second attached ends are placed under compression when said shock absorbing device encounters road surface irregularities and road shocks causing said medial portions of said elongated spring elements to deflect outwardly and radially with respect to said longitudinal axis of the device.

12. The device of claim 11 including a shock absorbing unit secured between said first and second attachments along said longitudinal axis of said shock absorbing device mounted coaxially with said elongated spring elements.

13. The device of claim 11 wherein said elongated slender spring elements comprise a medial portion having a cross-section with a thickness that is greater than that of said end portions so that cantilevered arms are formed generally on opposing sides of said medial portion extending between said medial portion and said first and second ends in a manner that compression of said spring elements causes bending of said cantilevered arms inwardly toward the longitudinal axis of said device during compression.

14. The device of claim 11 wherein said elongated spring elements include strands of reinforcing fibers embedded in a matrix material generally parallel to said longitudinal axis and in a uniform manner with respect to each other to facilitate a high cycle life for the bending and elongation of said fibers.

15. A vehicle shock absorbing device for absorbing loads from road shocks and the like of the type having a first support part for attachment to a first movable frame element and a second support part for attachment to a second movable frame element, said first and second parts being movable toward each other along a central longitudinal axis extending between said first and second part attachments, said device, when not under load, comprising:
a concentric arrangement of a plurality of elongated one-piece slender fiber reinforced spring elements extending generally straight and parallel to the longitudinal axis of said device;
said elongated slender spring elements having first and second ends attached respectively to said first and second support members, a medial portion, and first and second end portions adjoining said first and second ends and said medial portion;
said medial portion having a cross-section with a thickness that is greater than that of said first and second end portions so that cantilevered arms are formed generally on opposing sides of said medial portion extending between said medial portion and said first and second ends in a manner that compression of said spring elements causes bending of said cantilevered arms inwardly toward the longitudinal axis of said device during compression;
said elongated slender spring elements having a longitudinal axis parallel to said longitudinal axis of said device; and
said one-piece spring elements being constructed and arranged such that said medial portion of said spring elements deflects away from said longitudinal axis when said first and second ends are loaded under compression.

16. The device of claim 15 wherein said elongated spring elements are carried by said first and second support parts in a manner that said medial portion deflect radially with respect to the longitudinal axis of the device.

17. The device of claim 16 wherein said elongated spring elements have a rectangular cross-section defined by prescribed width and thickness wherein said width is greater than said thickness and faces the longitudinal axis of said device.

18. The device of claim 17 wherein said spring elements vary in cross-sectional thickness along the length thereof.

19. The device of claim 15 wherein elongated spring elements are carried by said first and second support parts in a manner that medial portions of said spring elements deflect circumferentially with respect to the longitudinal axis of the device.

20. The device of claim 17 wherein said spring elements vary in cross-sectional thickness along the length thereof.

21. A spring device for handling compressive loads in a shock absorbing device and the like, when not under load, comprising:
a longitudinal axis;
a first support member carried along said longitudinal axis;
a second support member carried along said longitudinal axis spaced from said first support member;
a plurality of elongated slender fiber reinforced one-piece spring elements having first and second attached ends attached respectively to said first and second support members and a longitudinal axis arranged generally parallel to the longitudinal axis of said device when not under load;
means affixing said first and second attached ends of said spring elements to said respective first and second support members for compressive loading as said first and second support members move relatively towards each other;
said one-piece spring elements each consisting of a medial portion curved concavely with respect to said longitudinal axis, first and second arms extending respectively between said medial portion and said first and second attached ends, said first and second arms consisting solely of a reverse curve extending directly from said medial portion to said attached ends, said reverse curve being curved in an opposite direction than said concavely curved medial portion, and
said one-piece spring elements being constructed and arranged such that a medial portion deflects away from said longitudinal axis when said first and second attached ends and said first and second arms are placed under compression.

22. The device of claim 21 wherein said elongated spring elements have a rectangular cross-section which varies in area along the length thereof.

23. The device of claim 22 wherein said cross-section has a greater thickness in a medial portion than at the ends thereof creating first and second cantilevered arms adjacent said medial portion which deflect inwardly causing said medial portion to deflect outwardly when said first and second ends are compressed along said longitudinal axis thereof.

24. The device of claim 1 including a first circumferential row of fiber-reinforced spring elements carried about the longitudinal axis of said device and a second circumferential row of fiber-reinforced spring elements carried inside of and concentric with said first concentric row.

25. A vehicle shock absorbing device for absorbing loads from road shocks and the like of the type having a first support part for attachment to a first movable frame element and a second support part for attachment to a second movable frame element, said first and second parts being movable towards each other along a central longitudinal axis extending between said first and second part attachments, said device, when not under load, comprising:
a first circumferential row of a plurality of first elongated slender fiber-reinforced spring elements extending generally straight and parallel to the longitudinal axis of said device;
a second circumferential row of a second plurality of elongated slender fiber-reinforced spring elements extending generally straight and parallel to the longitudinal axis of said device;
said circumferential second row of spring elements being inside of and concentric with said first circumferential row of fiber elements;
said first and second elongated slender spring elements having first and second ends attached respectively to said first and second support parts with a medial portion adjoining said first and second ends;
said first and second elongated slender spring elements having a longitudinal axis parallel to said longitudinal axis of said device; and
said first and second elongated spring elements having a contoured profile causing said medial portion of said spring elements to deflect away from the longitudinal axis of said spring elements in a circumferential direction relative to said longitudinal axis of said device during compression to accommodate loads from road shocks and the like on said vehicle.

26. The device of claim 25 wherein said first support part includes an interior hollow sleeve, a slider carried in said sleeve for relative vertical movement, and said ends of said second row of said second elongated spring elements being held by said slider in such a manner that said second spring elements are not compressed until said first support moves towards said second support part a predetermined distance so that said second spring elements are not compressed until said first spring elements have been compressed in accordance with said predetermined distance.

27. The device of claim 26 wherein said medial portion of said first and second spring elements has a thicker cross-section than the ends of said first and second spring elements; and wherein the medial portions of said first spring elements face in an opposite direction to the medial portions of said second spring elements in said respective first and second circumferential rows.

28. The device of claim 25 wherein said first and second spring elements comprise a medial bend curved outwardly away from a longitudinal axis of said spring elements defining first and second cantilevered arms on each side of medial bend by which said spring elements flex so that said medial portion deflects outwardly away from a longitudinal axis of said spring elements under compression.

29. The device of claim 28 wherein said first and second spring elements further include a reverse bend formed at the ends thereof on opposing sides of said medial bend which curve in a direction opposite to the curve of said medial bend so that said end portions are held in said first and second support parts in such a manner that said spring elements are placed under compression upon movement of said first and second support parts towards each other.

30. The device of claim 21, wherein said spring elements are arranged in a circumferential row concentrically about the longitudinal axis of the shock absorbing device with each of said spring elements having a front medial portion facing a back medial portion of the next adjacent spring element in said circumferential row.

* * * * *